United States Patent
Asahara

(10) Patent No.: US 9,723,167 B2
(45) Date of Patent: Aug. 1, 2017

(54) MANAGING THE ACTIVATION OF AN APPLICATION IN AN INFORMATION PROCESSING APPARATUS ON WHICH A PLURALITY OF APPLICATIONS OPERATE

(71) Applicant: CANON KABUSHIKI KAISHA, Tokyo (JP)

(72) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/085,870

(22) Filed: Mar. 30, 2016

(65) Prior Publication Data

US 2016/0295054 A1    Oct. 6, 2016

(30) Foreign Application Priority Data

Apr. 2, 2015   (JP) ................................ 2015-075823

(51) Int. Cl.
*H04N 1/00* (2006.01)
(52) U.S. Cl.
CPC ..... *H04N 1/00915* (2013.01); *H04N 1/00477* (2013.01); *H04N 1/00941* (2013.01); *H04N 2201/0094* (2013.01)
(58) Field of Classification Search
None
See application file for complete search history.

(56) References Cited

U.S. PATENT DOCUMENTS

| | | | |
|---|---|---|---|
| 6,883,170 B1* | 4/2005 | Garcia | G06F 11/1438 707/999.001 |
| 2015/0334105 A1* | 11/2015 | Kessler | H04L 63/08 726/5 |

FOREIGN PATENT DOCUMENTS

JP        H06-337798 A        12/1994

* cited by examiner

*Primary Examiner* — Thomas D Lee
(74) *Attorney, Agent, or Firm* — Canon USA, Inc. I.P. Division

(57) ABSTRACT

An information processing apparatus includes a start unit which, in a case where one of the applications is to be activated at a time of activating the information processing apparatus, performs a start process of the application based on a task for each of the applications, the task being different from a task giving an instruction to activate the application, a monitoring unit which monitors whether the start process of the application is completed in a predetermined time, and an interruption unit which, in a case where the start process of the application is not completed in the predetermined time, interrupts the start process of the application, and provides a mechanism capable of, even in a situation where the start processes of some applications cannot be completed, continuing the activation process of the apparatus itself and making the function of another application usable.

8 Claims, 11 Drawing Sheets

FIG. 3A

| APP | START PRIORITY | WHETHER TO START AT A TIME OF ACTIVATION |
|---|---|---|
| copy | 1 | START |
| box | 2 | START |
| send_a | 3 | START |
| send_b | 4 | NOT START |

FIG. 3B

| APP | START PRIORITY | WHETHER TO START AT A TIME OF ACTIVATION |
|---|---|---|
| copy | 1 | START |
| box | 2 | START |
| send_a | 3 | START |
| send_b | 4 | NOT START |
| App1 | 10 | START |
| App2 | 11 | START |

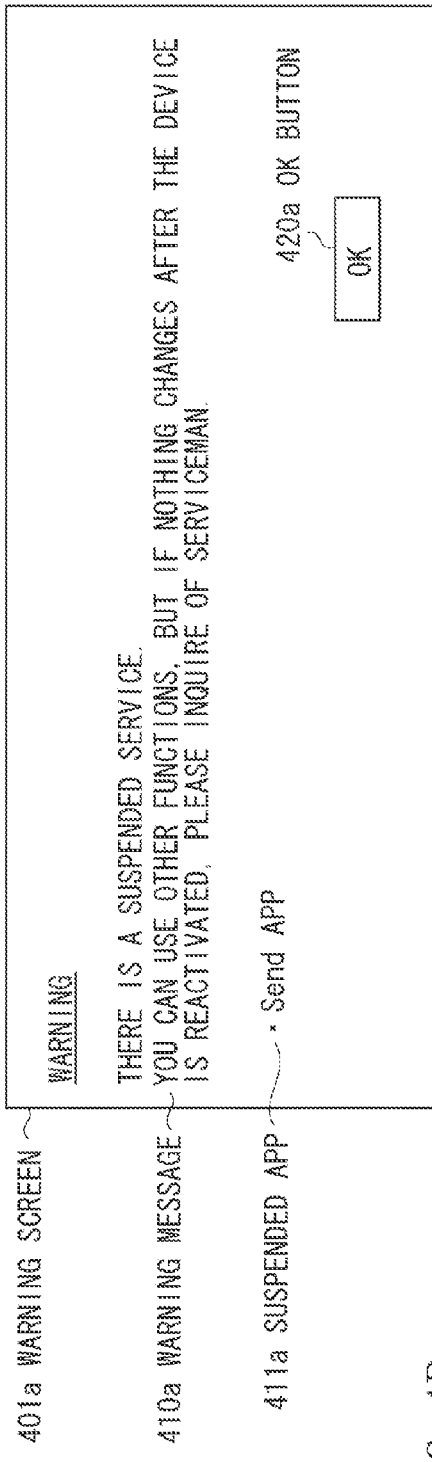
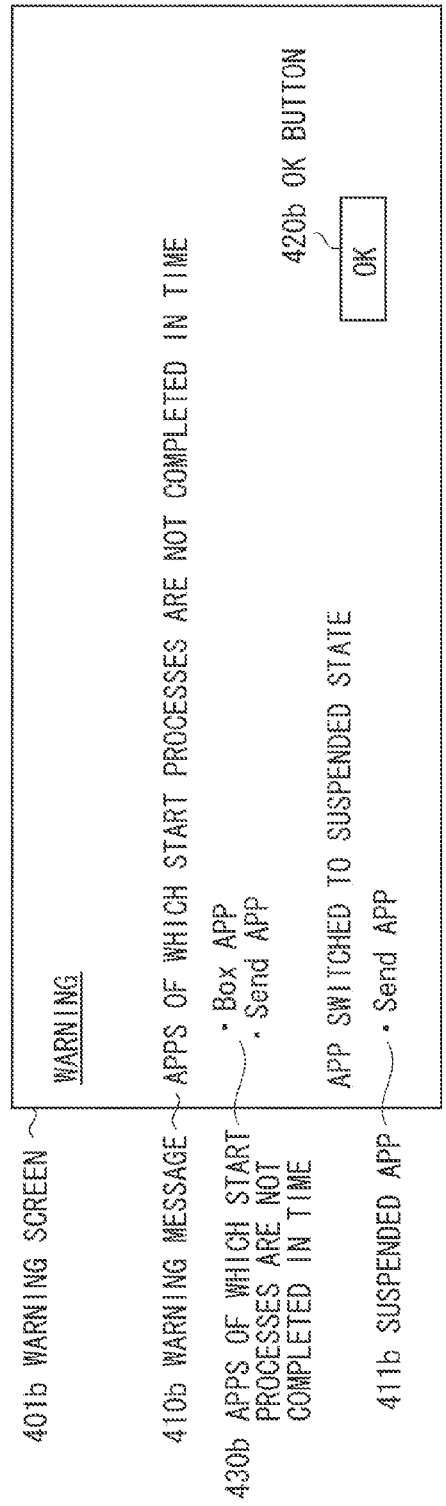

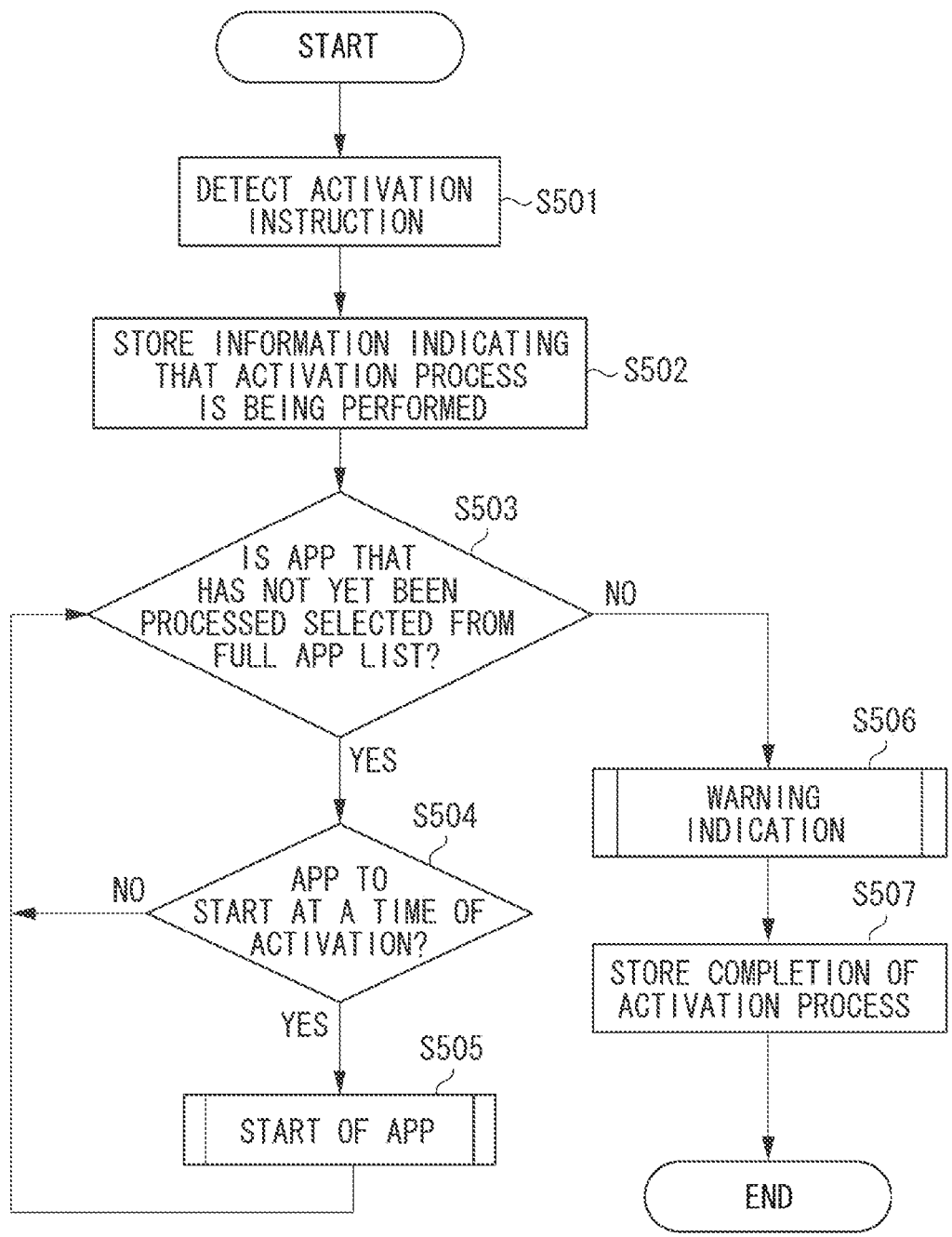

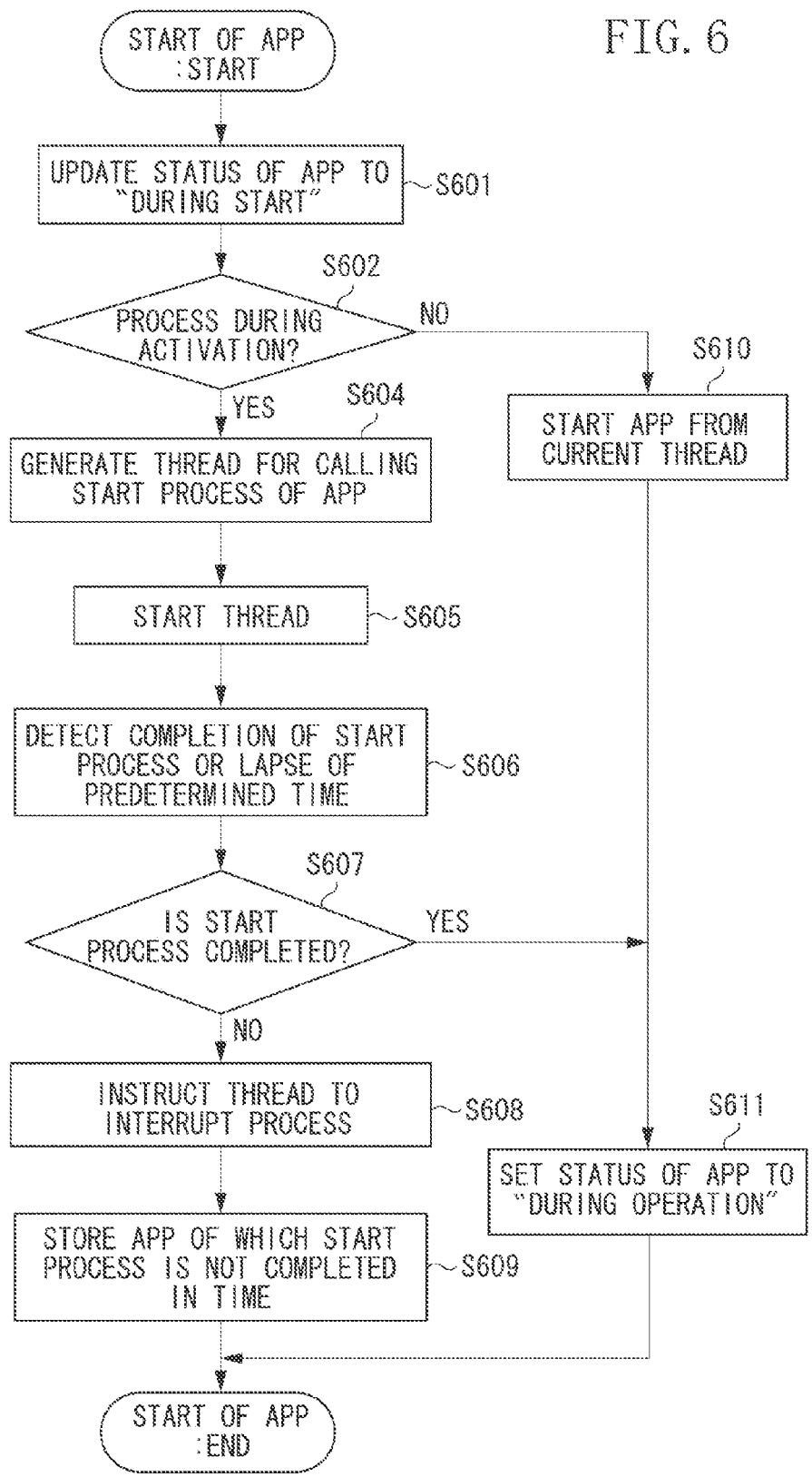

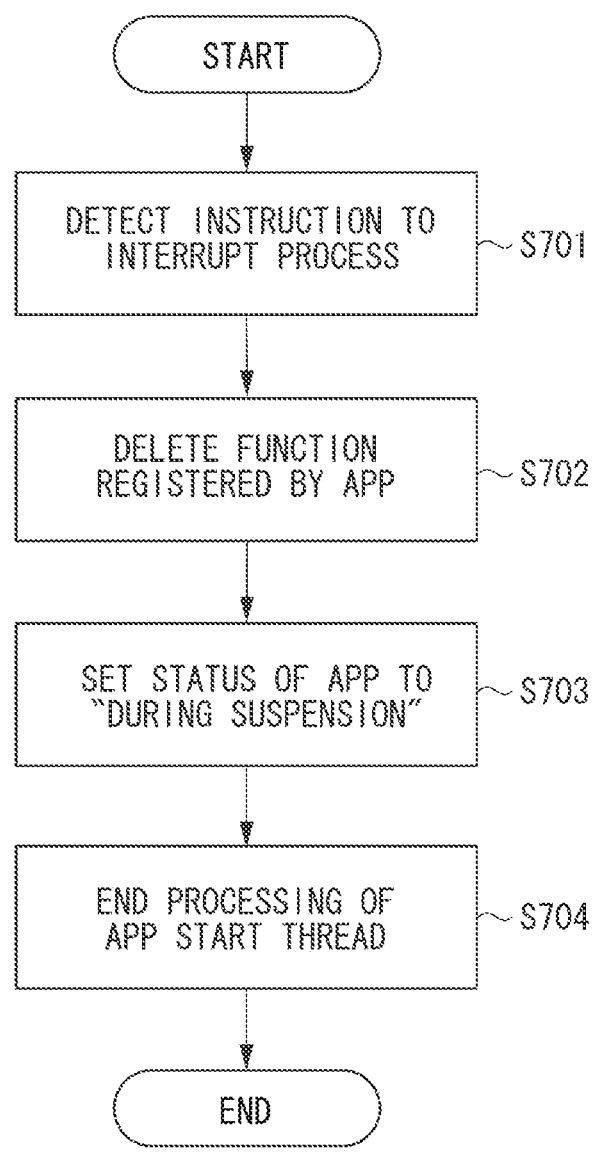

MANAGING THE ACTIVATION OF AN APPLICATION IN AN INFORMATION PROCESSING APPARATUS ON WHICH A PLURALITY OF APPLICATIONS OPERATE

BACKGROUND OF THE INVENTION

Field of the Invention

The present invention relates to a technique for managing the activation of an application in an information processing apparatus on which a plurality of applications operate.

Description of the Related Art

A plurality of applications (hereinafter referred to as "apps") operate on an image forming apparatus, and a new value is created using the cooperative operation between the apps. When the image forming apparatus is activated, generally, the image forming apparatus calls the start process of a predetermined app and makes the function provided by the app usable.

If, however, the start process of a particular app is not normally finished and for example, is suspended while waiting for another process, it is not possible to use even the function provided by an app other than the particular app of which the start process cannot be completed.

As a conventional technique related to this problem, a deadlock detection apparatus is discussed in Japanese Patent Application Laid-Open No. 6-337798. Japanese Patent Application Laid-Open No. 6-337798 discusses an apparatus for detecting a deadlock caused by resources occupied by a plurality of tasks.

SUMMARY OF THE INVENTION

According to an aspect of the present invention, an information processing apparatus on which a plurality of applications operate includes a start unit configured to, in a case where one of the applications is to be activated at a time of activating the information processing apparatus, perform a start process of the application based on a task for each of the applications, the task being different from a task giving an instruction to activate the application, a monitoring unit configured to monitor whether the start process of the application is completed in a predetermined time, and an interruption unit configured to, in a case where the start process of the application is not completed in the predetermined time, interrupt the start process of the application, wherein, in a case where the interruption unit interrupts the start process of the application, the start unit shifts to a start process of another one of the applications.

Further features of the present invention will become apparent from the following description of exemplary embodiments with reference to the attached drawings.

BRIEF DESCRIPTION OF THE DRAWINGS

FIGS. 3A and 3B are diagrams illustrating examples of app lists.

FIGS. 4A and 4B are diagrams illustrating examples of warning screens.

FIG. 5 is a flowchart illustrating an activation process of an image forming apparatus according to a first exemplary embodiment.

FIG. 6 is a flowchart illustrating a start process of an app according to the first exemplary embodiment.

FIG. 7 is a flowchart illustrating a process of interrupting the start process of the app.

DESCRIPTION OF THE EMBODIMENTS

In the technique of Japanese Patent Application Laid-Open No. 6-337798, an app needs to include in advance a mechanism for identifying a resource to be used when a task is executed. This increases the trouble in the development of an app. Further, the technique cannot be applied to an app that does not include this mechanism.

Further, in the technique of Japanese Patent Application Laid-Open No. 6-337798, it is only possible to detect a deadlock regarding a resource. Thus, the technique is not effective, for example, in a situation where the start process of an app is not completed due to a bug or the corruption of a program file.

The present invention has been conceived to solve the aforementioned problems. The present invention is directed to a mechanism capable of, even in a situation where the start processes of some applications cannot be completed, continuing the activation process of an apparatus itself, and making the function of another application usable.

Exemplary embodiments for carrying out the present invention will be described below with reference to the drawings.

First, terms are defined.

An apparatus user is defined as a person who uses an image forming apparatus according to the present exemplary embodiment.

A service engineer is defined as a person who repairs and maintains the image forming apparatus according to the present exemplary embodiment at the request of the apparatus user.

A user is defined as a collective term including the apparatus user and the service engineer.

An app is a shortened form of "application". The app is software operating on the image forming apparatus according to the present exemplary embodiment, and provides some function for the user directly or indirectly. The app also includes software for controlling the operation of hardware held in or attached afterwards to the image forming apparatus according to the present exemplary embodiment.

The start process of an app is defined as a process for enabling the user to use the function provided by the app. For example, the process can include reading a setting value for switching the operation environment of the app, or performing a communication test with a server with which the app operates cooperatively. The specific content of the start process depends on each app, and can include various types of processing.

Starting an app is defined as calling the above start process of the app.

An app type is defined as information indicating the classification of an app. The app type includes three types, "system", "general", and "login". Alternatively, the app type may be classified into more detailed types. An app of the app type "system" corresponds to an app prepared in advance as firmware for the image forming apparatus.

A task is defined as a unit of a program operating under an operating system (OS). The task corresponds to a process or a thread.

Figure 1:
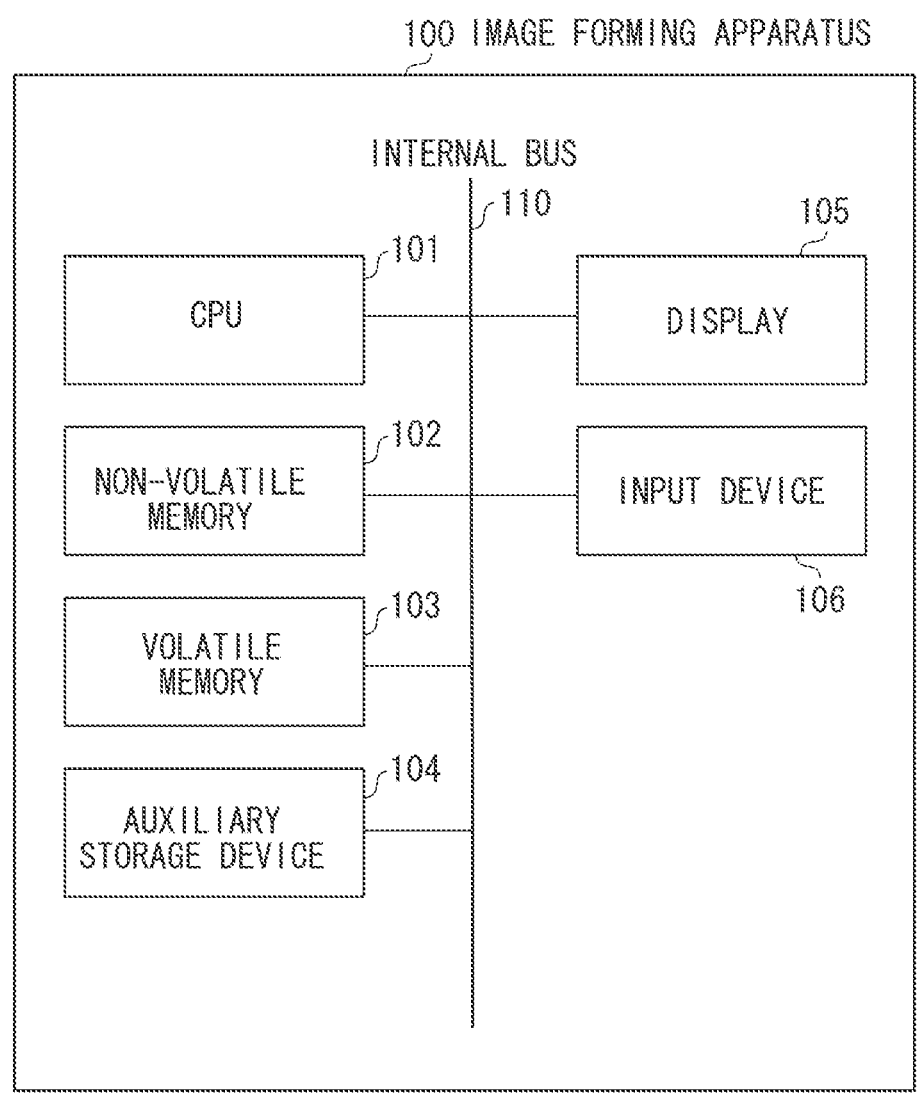
FIG. 1 is a hardware configuration diagram of an image forming apparatus according to an exemplary embodiment of the present invention.

A first exemplary embodiment is described below. FIG. 1 is a diagram illustrating an example of a hardware configuration of an image forming apparatus 100 according to an exemplary embodiment of the present invention.

The image forming apparatus 100 is typified by a multi-function peripheral (MFP) and has the functions of forming an image, such as print, scan, and facsimile functions. A central processing unit (CPU) 101 reads and executes a program stored in a non-volatile memory 102 or an auxiliary storage device 104, thereby controlling various types of processing.

The non-volatile memory 102 includes a read-only memory (ROM) and stores a program and data necessary for an early stage in the activation process of a device. A volatile memory 103 includes a random-access memory (RAM) and is used as a temporary storage location for a program and data.

The auxiliary storage device 104 includes a large-capacity storage device such as a hard disk or a RAM drive, stores large-volume data, holds an executable code of a program, and holds a setting value of the image forming apparatus 100. The auxiliary storage device 104 stores data that needs to be held for a longer time than in the volatile memory 103. The auxiliary storage device 104 is a non-volatile storage device and therefore can continue to store data even if the image forming apparatus 100 is powered off.

A display 105 is a display device for conveying information to the user.

An input device 106 is a device for receiving a selection instruction from the user and transmitting the selection instruction to a program via an internal bus 110.

The internal bus 110 is a communication bus for connecting hardware apparatuses with one another in a mutually communicable manner in the image forming apparatus 100.

Although not illustrated in FIG. 1, the image forming apparatus 100 may be configured to include a network interface for communicating with an external apparatus via a network, and an external interface for connecting to an external memory.

Figure 2:
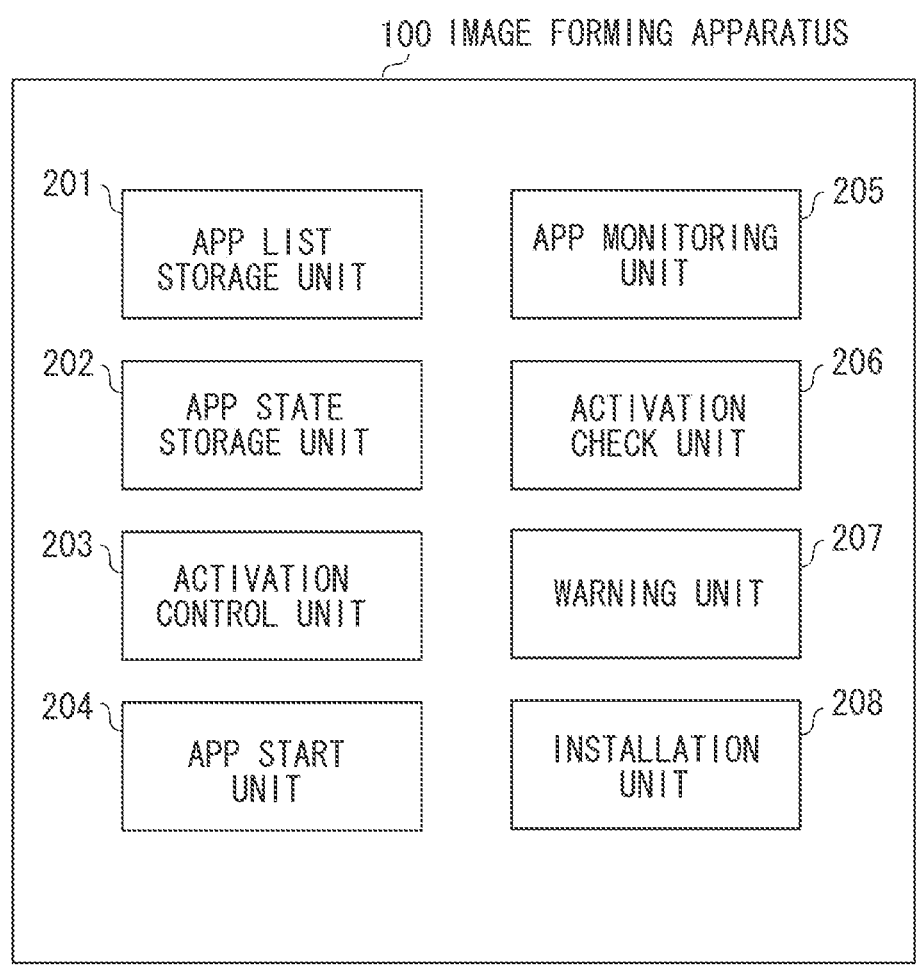
FIG. 2 is a software configuration diagram of the image forming apparatus of an exemplary embodiment of the present invention.

FIG. 2 is a diagram illustrating an example of the software configuration of the image forming apparatus 100.

Each piece of software illustrated in FIG. 2 is stored in the non-volatile memory 102 or the auxiliary storage device 104 so that the software can be executed by the CPU 101 in the image forming apparatus 100. The function of the software is achieved by the CPU 101 executing the software. Further, various pieces of information used when these pieces of software are executed are held in the volatile memory 103 or the auxiliary storage device 104 of the image forming apparatus 100 and exchanged between the pieces of software.

Each software unit is described below.

An app list storage unit 201 stores, as an app list, list information of apps operating on the image forming apparatus 100. There are two types of app lists. One of the app lists is a list of apps prepared in advance as firmware for the image forming apparatus 100. This list is referred to here as an "initial app list". With reference to FIG. 3A, an example of the initial app list is described below.

FIG. 3A is a diagram illustrating an example of the initial app list. In the column "app", the name of an app is stored. In the example illustrated in FIG. 3A, four types of apps ("copy", "box", "send_a", and "send_b") are present. Alternatively, in the column "app", instead of the name of an app, the identifier of the app or text to be shown to the user may be stored.

In the column "start priority", the priority with which an app start unit 204 (described below) starts an app when the image forming apparatus 100 is activated is stored. The priority is represented by a figure such that the smaller the value of the priority, the earlier the app is started. In the example of FIG. 3A, the apps are started in the order of "copy", "box", "send_a", and "send_b".

In the column "whether to start at a time of activation", information indicating whether to start an app when the image forming apparatus 100 is activated is stored. If the value of "whether to start at a time of activation" is "start", the app start unit 204 starts the app when the image forming apparatus 100 is activated. If, on the other hand, the value of "whether to start at a time of activation" is "not start", the app start unit 204 does not start the app when the image forming apparatus 100 is activated. In the example of FIG. 3A, only the app "send_b" is not started when the image forming apparatus 100 is activated.

Returning to FIG. 2, the other app list stored in the app list storage unit 201 is a list including also an app installed later by an installation unit 208 in addition to the initial apps. This list is referred to as a "full app list". With reference to FIG. 3B, an example of the full app list is described below.

FIG. 3B is a diagram illustrating an example of the full app list.

As illustrated in FIG. 3B, the columns prepared in the full app list are equivalent to those in FIG. 3A. In the full app list, apps "App1" and "App2" are stored in addition to the four apps stored in FIG. 3A.

In the present exemplary embodiment, the configuration in which the full app list and the initial app list are stored separately has been described. This is because the initial app list is treated together with the firmware for the image forming apparatus 100 and therefore may be stored in a storage area where overwriting is not allowed. Further, the initial app list can be overwritten and updated together with the update of the firmware. Alternatively, the app lists may be stored in another configuration. For example, the configuration may be such that only the full app list is stored. Further, the configuration may be such that in this case, identifiers (described below) are held to allow the distinction between an app installed later by the installation unit 208 and the initial apps. In the present exemplary embodiment, the app list storage unit 201 stores both app lists in, for example, the auxiliary storage device 104. Alternatively, the app list storage unit 201 may store the initial app list in the non-volatile memory 102.

An app state storage unit 202 stores the state of an app (for example, in the volatile memory 103). In the present exemplary embodiment, the state of the app includes "during suspension", "during start", and "during operation". Alternatively, only some of these states may be included, or more various states may be included.

The state "during suspension" indicates the state where the function of the app cannot be used. The state "during start" indicates that the start process of the app is being executed, and indicates the state where the function of the app cannot be used because the start process is not finished.

The state "during operation" indicates the state where the start process of the app is completed, and the function of the app can be used.

An activation control unit 203 performs the activation process of the image forming apparatus 100 and calls the start process of each app in the activation process. Specifically, the activation control unit 203 references the full app list held in the app list storage unit 201 and requests the app start unit 204 to perform the start processes of apps in order according to "start priority". Further, until the activation process of the image forming apparatus 100 is finished, the activation control unit 203 stores (for example, in the volatile memory 103) information indicating that the activation process of the image forming apparatus 100 is being performed.

The app start unit 204 calls the start process of an app. The app start unit 204 determines whether the image forming apparatus 100 is being activated. If the image forming apparatus 100 is being activated, the app start unit 204 generates a dedicated thread for calling the start process of the app and calls the start process of the app from the generated thread. If, on the other hand, the image forming apparatus 100 is not being activated, the app start unit 204 calls the start process of the app from a thread of a request source requesting the start process of the app. In this case, the start process of the app is requested by a thread other than that of the activation control unit 203. In this case, there is no other thread, and therefore, it is not possible to monitor the finish of the start process or request the interruption of the process. In this case, unlike when the image forming apparatus 100 is being activated, part of the function of the image forming apparatus 100 can still be used. Thus, it is also possible to reduce a thread resource. Further, based on the progress of the start process of the app, the app start unit 204 stores the state of the app in the app state storage unit 202.

An app monitoring unit 205 monitors whether the start process of an app called by the app start unit 204 is completed in a predetermined time. If the start process of the app is not completed even after the predetermined time elapses, the app monitoring unit 205 requests the interruption of the start process of the app. Further, in preparation for a warning indication (described below), the app monitoring unit 205 stores (for example, in the volatile memory 103) the app of which the start process is not completed even after the predetermined time elapses.

To interrupt the start process of an app, it is necessary to take into account the fact that the start process of the app proceeds halfway. Thus, the app monitoring unit 205 searches for a function registered by the app and deletes the registered function. For example, the function corresponds to registering, in a framework for managing a screen to be displayed, a screen to be provided by the app. In this case, the app monitoring unit 205 cancels the registration of the registered screen. Further, as another example, the function corresponds to registering, in a framework for managing a cooperation function, a function to be provided for another app so that the registered function can be used. In this case, the app monitoring unit 205 cancels the registration of the registered function.

An activation check unit 206 checks whether an app is started as expected. Specifically, the activation check unit 206 checks whether there is an app which is stored by the app monitoring unit 205 and of which the start process is not completed even after the predetermined time elapses. Further, the activation check unit 206 compares information of "whether to start at a time of activation" of all apps stored in the full app list, with the state of the current app held in the app state storage unit 202, thereby checking whether there is a difference therebetween. In this manner, the activation check unit 206 checks whether a warning unit 207 should give warning.

The warning unit 207 displays a warning message on the display 105. The content of the warning is the content checked by the activation check unit 206.

FIGS. 4A and 4B are diagrams illustrating examples of a warning screen to be displayed in a case where there is a problem with the start process of an app.

A warning screen 401a is an example of a warning screen for the apparatus user.

As illustrated in the warning screen 401a, a warning message 410a includes a message describing the presence of a suspended app, and a navigation message urging the apparatus user to inquire of the service engineer. In this example, as illustrated in 411a, warning is given that some kind of problem has occurred in a Send app, and the Send app is "during suspension". This message enables the apparatus user to become aware that the Send app cannot be used.

Further, as illustrated in a warning screen 401b, the warning screen 401b is an example of a warning screen for the service engineer. A warning message 410b gives warning that there are apps of which the start processes are not finished in time (430b), and that there is an app that is actually "during suspension" (411b). In this example, as illustrated in 430b and 411b, warning is given that some kind of problem has occurred in a Send app, and the Send app is "during suspension". Further, as illustrated in 411b, it is indicated that a Box app is currently "during operation", but the start process of the Box app is not finished in the predetermined time, either, and warning is given that there may be some kind of problem. This warning enables the service engineer to take measures such as updating the firmware or replacing the auxiliary storage device 104.

Returning to FIG. 2, the installation unit 208 adds a new app to the image forming apparatus 100. The new app is acquired via an external storage device (not illustrated) or a network apparatus (not illustrated), loaded, and added.

FIG. 5 is a flowchart illustrating the flow of the activation process performed by the image forming apparatus 100 according to the first exemplary embodiment. The processing corresponding to the flowcharts illustrated in FIGS. 5 to 11 is achieved by the software illustrated in FIG. 2. That is, the processing corresponding to these flowcharts is achieved by the CPU 101 of the image forming apparatus 100 executing a program stored in the non-volatile memory 102 or the auxiliary storage device 104.

In step S501, if the activation control unit 203 detects an instruction to activate the image forming apparatus 100, the processing proceeds to step S502.

In step S502, the activation control unit 203 stores, in the volatile memory 103, information indicating that the activation process of the image forming apparatus 100 is being performed.

Next, in step S503, the activation control unit 203 performs the process for acquiring the full app list (e.g., FIG. 3B) from the app list storage unit 201 and selecting one app that has not yet been processed. At this time, the activation control unit 203 selects an app in descending order of start priority. Then, if the activation control unit 203 determines that an app that has not yet been processed has been selected (Yes in step S503), the processing proceeds to step S504.

In step S504, the activation control unit 203 determines whether the app selected in step S503 is an app to start in the activation. The determination of whether the selected app is an app to start in the activation is made based on information of "whether to start at a time of activation" in the full app list.

Then, if the activation control unit 203 determines that the selected app is not an app to start in the activation (No in step S504), the processing returns to step S503, and activation control unit 203 repeats the process on the next app.

If, on the other hand, it is determined that the selected app is an app to start in the activation (Yes in step S504), the activation control unit 203 instructs the app start unit 204 to start the app. If receiving this instruction, then in step S505, the app start unit 204 starts the app. The details of the process of step S505 will be described below with reference to FIG. 6. Then, the processing returns to step S503, and activation control unit 203 repeats the processes on the next app.

Then, if it is determined in step S503 that an app that has not yet been processed is not present and therefore is not selected (No in step S503), the activation control unit 203 notifies the activation check unit 206 of the determination result, and the processing proceeds to step S506. If receiving this notification, then in step S506, the activation check unit 206 performs a warning indication process. The details of the process of step S506 will be described below with reference to FIG. 8.

Next, in step S507, the activation control unit 203 stores, in the volatile memory 103, information indicating that the activation process of the image forming apparatus 100 is completed. Then, the processing of this flowchart is ended.

FIG. 6 is a flowchart illustrating the flow of the start process of the app illustrated in step S504 in FIG. 5, according to the first exemplary embodiment.

In step S601, the app start unit 204 updates the status of the app of which the start process is to be called now, to "during start".

Next, in step S602, the app start unit 204 determines whether this start process is a process performed during the activation of the image forming apparatus 100. Then, if the activation control unit 203 determines that the image forming apparatus 100 is being activated (Yes in step S602), the processing proceeds to step S604.

In step S604, the app start unit 204 generates a thread for calling the start process of the app.

Next, in step S605, the app start unit 204 starts the processing of the thread generated in step S604. If the processing of the thread is started, the start process of the app is executed in the context of the started thread.

In step S606, the app monitoring unit 205 detects whether the start process of the app called by the thread started in step S605 is completed, or the predetermined time elapses. The app monitoring unit 205 waits to detect either state. If the app monitoring unit 205 detects either state, the processing proceeds to step S607.

In step S607, the app monitoring unit 205 inquires of the thread calling the start process of the app (thread started in step S605) about whether the start process of the app is finished, thereby making a determination. Then, if the app monitoring unit 205 determines that the start process of the app is not finished (No in step S607), the processing proceeds to step S608.

In step S608, the app monitoring unit 205 instructs the thread started in step S605 to interrupt the process. The processing of the thread instructed to interrupt the process will be described in detail with reference to FIG. 7.

Next, in step S609, the app monitoring unit 205 stores, for example, in the volatile memory 103, information of the app of which the start process is not finished in the predetermined time (information about the app that is not activated in time). Then, the processing of this flowchart is ended.

Further, if the app start unit 204 determines in step S602 that the image forming apparatus 100 is not being activated (No in step S602), the processing proceeds to step S610.

In step S610, the app start unit 204 calls the start process of the app directly from the current thread, and the processing proceeds to step S611.

In step S611, the app start unit 204 sets the status of the app to "during operation", and the start process of this app is ended.

Further, if it is determined in step S607 that the start process of the app is finished (Yes in step S607), the app monitoring unit 205 notifies the app start unit 204 that the start process of the app called by the app start unit 204 is completed in the predetermined time. If receiving this notification, then in step S611, the app start unit 204 sets the status of the app to "during operation", and the start process of this app is ended.

FIG. 7 is a flowchart illustrating the flow of the process for interrupting the start process of the app. Specifically, the processing performed by the thread instructed to interrupt the process illustrated in step S608 in FIG. 6 is described below.

In step S701, if the app start unit 204 detects that the thread is instructed to interrupt the process, the processing proceeds to step S702.

In step S702, the app start unit 204 deletes a function registered by the app before the instruction to interrupt the start process is detected in step S701.

Next, in step S703, the app start unit 204 sets the status of the app to "during suspension".

Next, in step S704, the app start unit 204 ends the processing of the app start thread, and the processing of this flowchart ends.

Figure 8:
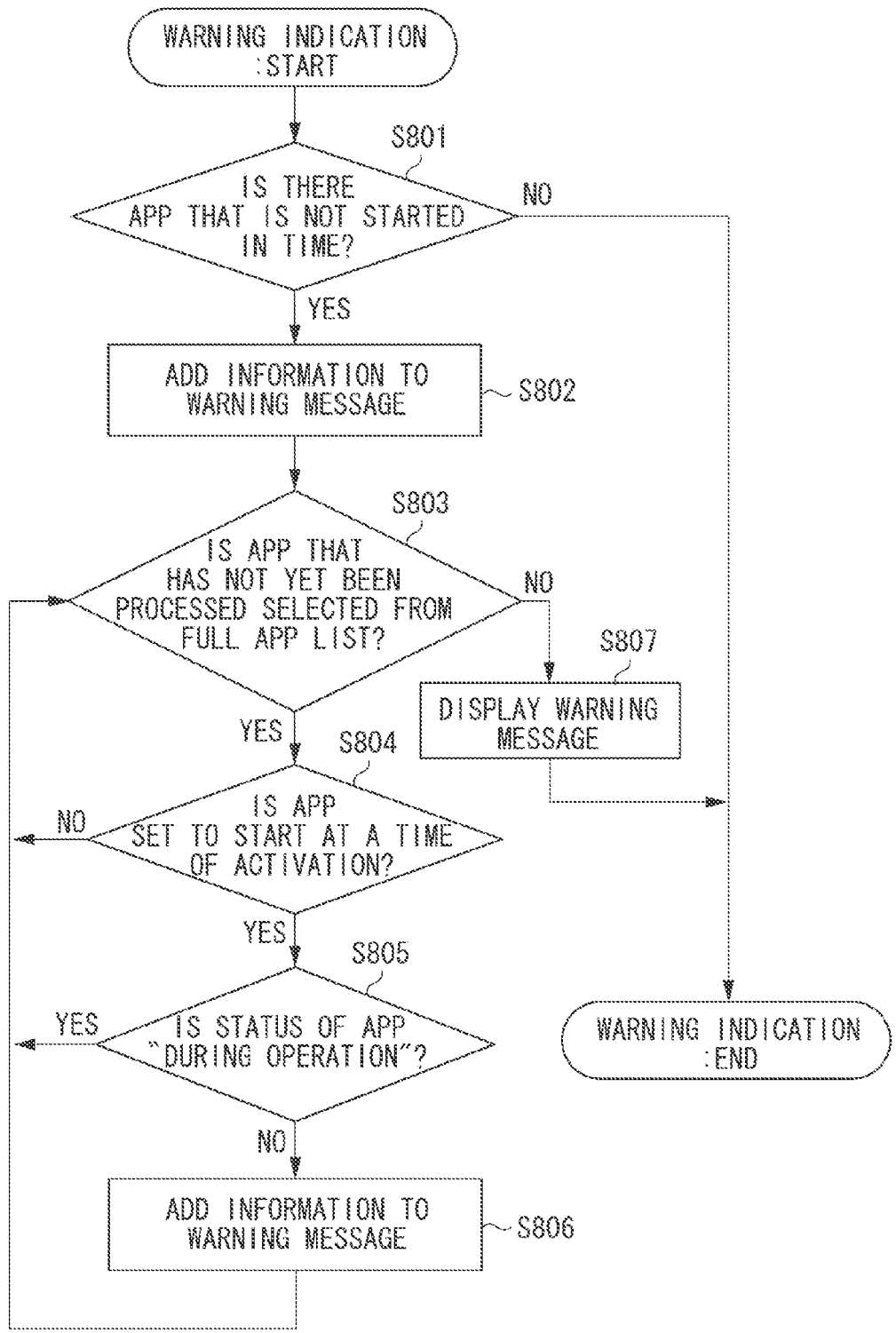
FIG. 8 is a flowchart illustrating a warning indication process.

FIG. 8 is a flowchart illustrating the flow of the warning indication process. In other words, the indication process illustrated in step S506 in FIG. 5 is described below.

In step S801, the activation check unit 206 determines whether there is an app of which the start process is not completed in the predetermined time while the image forming apparatus 100 is being activated (whether the information about the app that is not activated in time in step S609 in FIG. 6 is stored). Then, if the activation check unit 206 determines that there is no app of which the start process is not completed in the predetermined time (No in step S801), it is not necessary to give a warning indication. Thus, the processing of this flowchart is ended.

If, on the other hand, it is determined in step S801 that there is an app of which the start process is not completed in the predetermined time (Yes in step S801), the processing proceeds to step S802.

In step S802, the activation check unit 206 adds information about the app of which the start process is not completed in the predetermined time, for example, to the volatile memory 103 as information about an app of which the start process is not completed in time as illustrated in a warning message 401b in FIG. 4B.

In step S803, the activation check unit 206 selects, from the full app list (e.g., FIG. 3B), one app that has not yet been processed. Then, if the activation check unit 206 determines that an app that has not yet been processed is present and selected (Yes in step S803), the processing proceeds to step S804.

In step S804, the activation check unit 206 determines whether the app selected in step S803 is an app to start in the activation of the image forming apparatus 100. Then, the activation check unit 206 determines the selected app is not an app to start in the activation (No in step S804), the processing returns to step S803, and the activation check unit 206 repeats the process on the next app.

If, on the other hand, it is determined that the selected app is an app to start in the activation (Yes in step S804), the processing proceeds to step S805.

In step S805, the activation check unit 206 determines whether the status of the app selected in step S803 is "during operation". If the activation check unit 206 determines that the status of the selected app is "during operation" (Yes in step S805), the processing returns to step S803, and the activation check unit 206 repeats the processes on the next app.

If, on the other hand, it is determined that the status of the selected app is not "during operation" (No in step S803), the processing proceeds to step S806.

In step S806, the activation check unit 206 adds information about the selected app to the volatile memory 103 as information about a suspended app in the warning message. Then, the processing returns to step S803, and the activation check unit 206 repeats the processes on the next app.

Then, if it is determined in step S803 that an app that has not yet been processed is not present and not selected (No in step S803), the processing proceeds to step S807.

In step S807, the activation check unit 206 instructs the warning unit 207 to give a warning indication. If receiving this instruction, the warning unit 207 displays a warning screen on the display 105 and displays the warning message to which the information is added by the activation check unit 206 in steps S802 and S806. In other words, in step S807, the warning unit 207 displays the information about the app of which the start process is not completed in the predetermined time, which is added to the warning message in step S802, as an app that is not activated in time as illustrated in 430*b* in FIG. 4B. Further, the warning unit 207 displays the information about the suspended app, which is added to the warning message in step S806, as a suspended app as illustrated in 411*b* in FIG. 4B. Consequently, it is possible to give the user of the image forming apparatus 100 a warning that some apps cannot be used.

Then, after the process of step S807, the processing of this flowchart is ended.

As illustrated above, according to the first exemplary embodiment, the app start unit 204 calls the start process of an app from another thread only when the image forming apparatus 100 is activated, and monitors the completion of the start process of the app or the lapse of a certain time. Thus, it is possible to prevent the activation process of the image forming apparatus 100 from stopping in the middle.

A second exemplary embodiment is described below. In the first exemplary embodiment, the configuration in which the start process of an app that is not completed in the predetermined time is interrupted has been described. An app of the app type "system" (e.g., an app described in the initial app list) is an app prepared in advance as firmware for the image forming apparatus 100. Thus, the start process time of the app can be estimated in advance. Thus, if the start process of such an app is not completed in the predetermined time, an instruction to interrupt the start process does not cause a problem. On the other hand, in a case of an app of an app type other than "system", the start process takes time under a particular condition. Thus, the start process time of the app cannot be estimated in advance. For example, the start process of the app may include communication with a server, and the communication may take time. Thus, in a case of an app of an app type other than "system", if an instruction is mistakenly given to interrupt the start process, the app may be adversely affected.

In the second exemplary embodiment, the configuration is such that an instruction is given to interrupt the start process of an app that is not completed in the predetermined time, only if the start process time of the app can be estimated in advance as in the app type "system". Consequently, if the start process time of an app cannot be estimated in advance as in the app types "login" and "general", it is possible to prevent the app from being adversely affected by an instruction mistakenly given to interrupt the start process of the app. The details will be described below.

Figure 9:
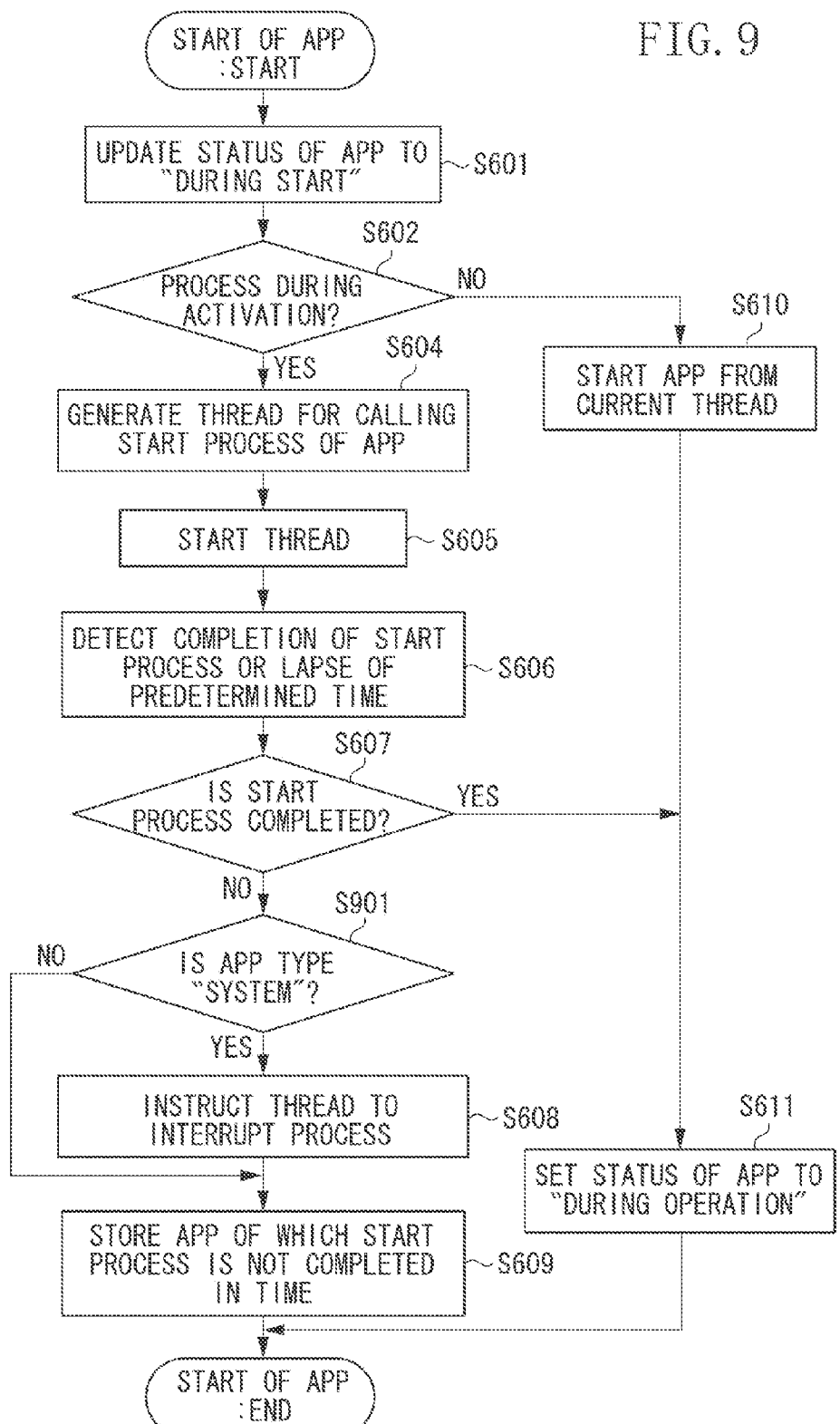
FIG. 9 is a flowchart illustrating a start process of an app according to a second exemplary embodiment.

FIG. 9 is a flowchart illustrating the activation process of the image forming apparatus 100 according to the second exemplary embodiment. Steps similar to those in FIG. 6 are designated by the same step numbers and therefore are not described here.

In the second exemplary embodiment, if the app monitoring unit 205 determines that the start process of the app is not finished (No in step S607), the processing proceeds to step S901.

In step S901, the app monitoring unit 205 confirms the app type of the app of which the start process is not finished according to the determination in step S607. For example, the app monitoring unit 205 determines that the app type of an app described in the initial app list is "system", or determines that the app type of an app that is not described in the initial app list is other than "system".

Then, if the app monitoring unit 205 determines that the app type of the app is "system" (Yes in step S901), the processing proceeds to step S608.

If, on the other hand, it is determined that the app type of the app is not "system" (No in step S901), the processing immediately proceeds to step S609.

As described above, step S901 in FIG. 9 is included in the processing, whereby it is possible to give an instruction to interrupt the start process of only an app of which the start process time can be estimated in advance, such as the app type "system". On the other hand, if the start process time of an app cannot be estimated in advance, such as the app types "login" and "general", it is possible to prevent the app from being adversely affected by mistakenly giving an instruction to interrupt the start process of the app.

The configuration in which the app type "system" is distinguished, thereby determining whether to give an instruction to interrupt the start process of an app has been described above. Alternatively, another rule may be used. For example, if the start process time of the app type "login" can be estimated in advance, the configuration may be such that it is determined whether the app type is either "system" or "login". Alternatively, an app type that is not described here may be used. For example, any configuration may be used so long as control is performed to determine whether the start process time of an app can be estimated in advance, and to give an instruction to interrupt the start process of the app of which the start process time can be estimated in advance.

A third exemplary embodiment is described below. In the first and second exemplary embodiments, the configuration in which the app monitoring unit 205 detects the lapse of a certain time in step S606 in FIG. 6 has been described. However, there is a case where performance significantly changes due to the operation environment, and therefore, it is difficult to determine a fixed time.

In response, in the third exemplary embodiment, the app monitoring unit 205 is configured to further include a mechanism for switching the waiting time according to the environment of the apparatus to operate.

Specifically, the configuration is such that a waiting time is held for each model of the image forming apparatus 100, such as a high-end model, a middle-range model, and a low-end model, and is appropriately used according to the execution environment.

Alternatively, the waiting time may be switched based on the operating system of the image forming apparatus 100. For example, the configuration may be such that a waiting time is held for each of an OS assumed to be used for a simulator and an OS assumed to be used for an image forming apparatus, and is appropriately used according to the OS in the execution environment. The present invention is applicable not only to an image forming apparatus, and but also to various information processing apparatuses for activating an app when the apparatus is activated.

Alternatively, the waiting time may be switched based on the apparatus specifications, such as the frequency or the number of cores of the CPU included in the apparatus. For example, a reference value for a CPU having a 3-GHz 2-core configuration may be held, so that, if the CPU in the execution environment has a 2-GHz 2-core configuration, the apparatus may wait one and half times longer than the reference value.

Further, it is clear that changing the waiting time in step S606 in FIG. 6 depending on the app as well is more desirable. Thus, the app monitoring unit 205 references a waiting time held by each app and waits for a time corresponding to the held waiting time until the start process is finished in step S606 in FIG. 6. Consequently, it is possible to wait for an appropriate time until the completion of the start process of each app. The waiting time for each app is stored in the full app list.

It is also easy to simultaneously achieve both the configuration in which the waiting time is changed depending on the operation environment, and the configuration in which the waiting time is changed depending on the app.

In addition to the configurations described in the first and second exemplary embodiments, the app monitoring unit 205 includes a mechanism as described above, whereby it is possible to set a more appropriate waiting time according to the execution environment or the app. Consequently, it is possible to prevent the occurrence of a situation where, while the start process of an app is normally operating, an instruction is erroneously given to interrupt the start process.

A fourth exemplary embodiments is described below. In the third exemplary embodiment, the waiting time for the start process of an app is a value obtained by desk calculation. Thus, it is necessary to leave a large margin for the waiting time in step S606 in FIG. 6 or 9. If the margin is too large, the activation time of the image forming apparatus 100, in a case where the start of the app is failed, is lengthened by this margin. Then, the user is kept waiting for the lengthened time.

In response, in the fourth exemplary embodiment, the app start unit 204 measures and stores the time taken to start an app, and waits for a subsequent start process to be finished based on the time actually taken.

Figure 10:
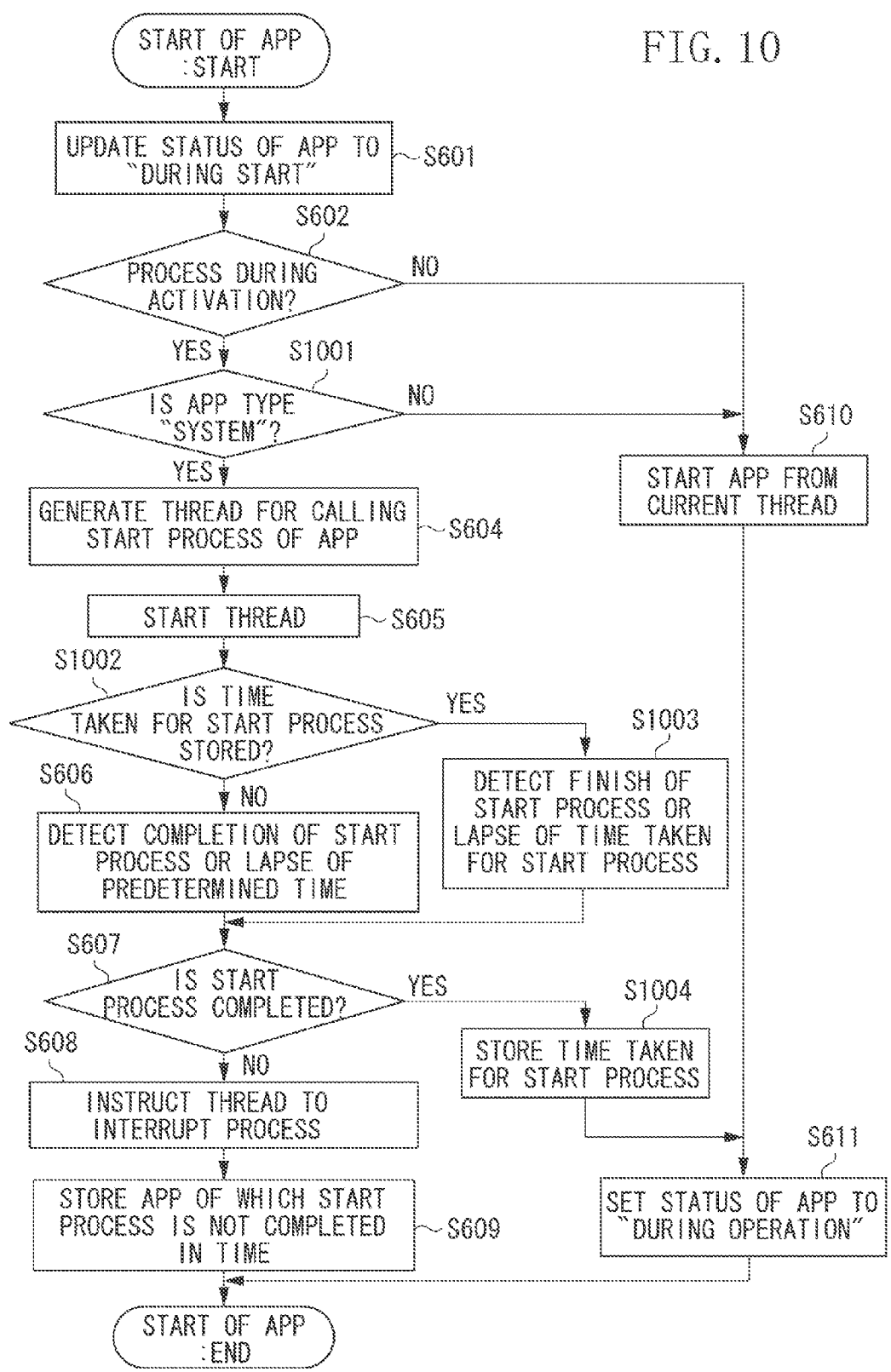
FIG. 10 is a flowchart illustrating a start process of an app according to a fourth exemplary embodiment.

FIG. 10 is a flowchart illustrating the activation process of the image forming apparatus 100 according to the fourth exemplary embodiment. Steps similar to those in FIG. 6 are designated by the same step numbers and therefore are not described here. In the fourth exemplary embodiment, if the app start unit 204 determines that the image forming apparatus 100 is being activated (Yes in step S602), the processing proceeds to step S1001.

In step S1001, the app start unit 204 confirms the app type of the app of which the start process is to be called.

Then, if the app start unit 204 determines that the app type of the app is not "system" (No in step S1001), the processing proceeds to step S610.

If, on the other hand, the app start unit 204 determines that the app type of the app is "system" (Yes in step S1001), the processing proceeds to step S604.

Further, in the fourth exemplary embodiment, if the thread is started in step S605, the app monitoring unit 205 starts measuring the time taken from the start to the completion of the start process of the app called by the started thread and executes the process of step S1002.

In step S1002, the app monitoring unit 205 determines whether the time taken for the start process of the app called by the thread started in step S605 is stored in the auxiliary storage device 104. Then, if the app monitoring unit 205 determines that the time taken for the start process of the app is not stored (No in step S1002), the processing proceeds to step S606.

If, on the other hand, the app monitoring unit 205 determines that the time taken for the start process of the app is stored (Yes in step S1002), the processing proceeds to step S1003.

In step S1003, the app monitoring unit 205 detects whether the start process of the app called by the thread started in step S605 is completed, or the stored time taken for the start process of the app elapses. In the present exemplary embodiment, the stored time taken for the start process of the app is used as it is. Alternatively, some margin may be provided based on the stored time taken for the start process of the app. The app monitoring unit 205 waits to detect either state. If the app monitoring unit 205 detects either state, the processing proceeds to step S607.

Further, in the fourth exemplary embodiment, if the app monitoring unit 205 determines in step S607 that the start process of the app is finished (Yes in step S607), the processing proceeds to step S1004. In step S1004, the app monitoring unit 205 stores, in the auxiliary storage device 104, the result obtained by measuring the time taken for the start process of the app that has been determined to be finished in step S607. The time stored at this time is referenced and used in steps S1002 and S1003. In the present exemplary embodiment, the time taken for the start process is stored as it is. Alternatively, some margin may be provided at this time. Alternatively, a statistic value obtained from the history of stored times, such as the average value of the previously stored time and the currently measured time, may be stored.

Further, after the process of step S1004, the app monitoring unit 205 notifies the app start unit 204 that the start process of the app called by the app start unit 204 is completed in the stored time. If receiving this notification, then in step S611, the app start unit 204 sets the status of the app to "during operation", and the start process of this app is ended.

Based on the above mechanism, it is possible to measure the time actually taken for the start process of an app and then wait for the measured time for the start process of an app. Thus, it is possible to set a more appropriate waiting time. Consequently, it is possible to prevent the occurrence of a situation where the user is kept waiting uselessly, and also prevent the occurrence of a situation where, while the start process of an app is normally operating, an instruction is erroneously given to interrupt the process.

A fifth exemplary embodiment is described below. In the configurations of the first to fourth exemplary embodiments, even if the start process of an app is not finished, it is possible to complete the activation process of the image forming apparatus. However, to change the situation where the start process of an app is not finished, the service engineer needs to handle the situation. Thus, until the service engineer handles the situation, a warning screen is displayed every time the apparatus is activated. In response, in the fifth exemplary embodiment, a configuration capable of somewhat automatically improving this situation is described.

Figure 11:
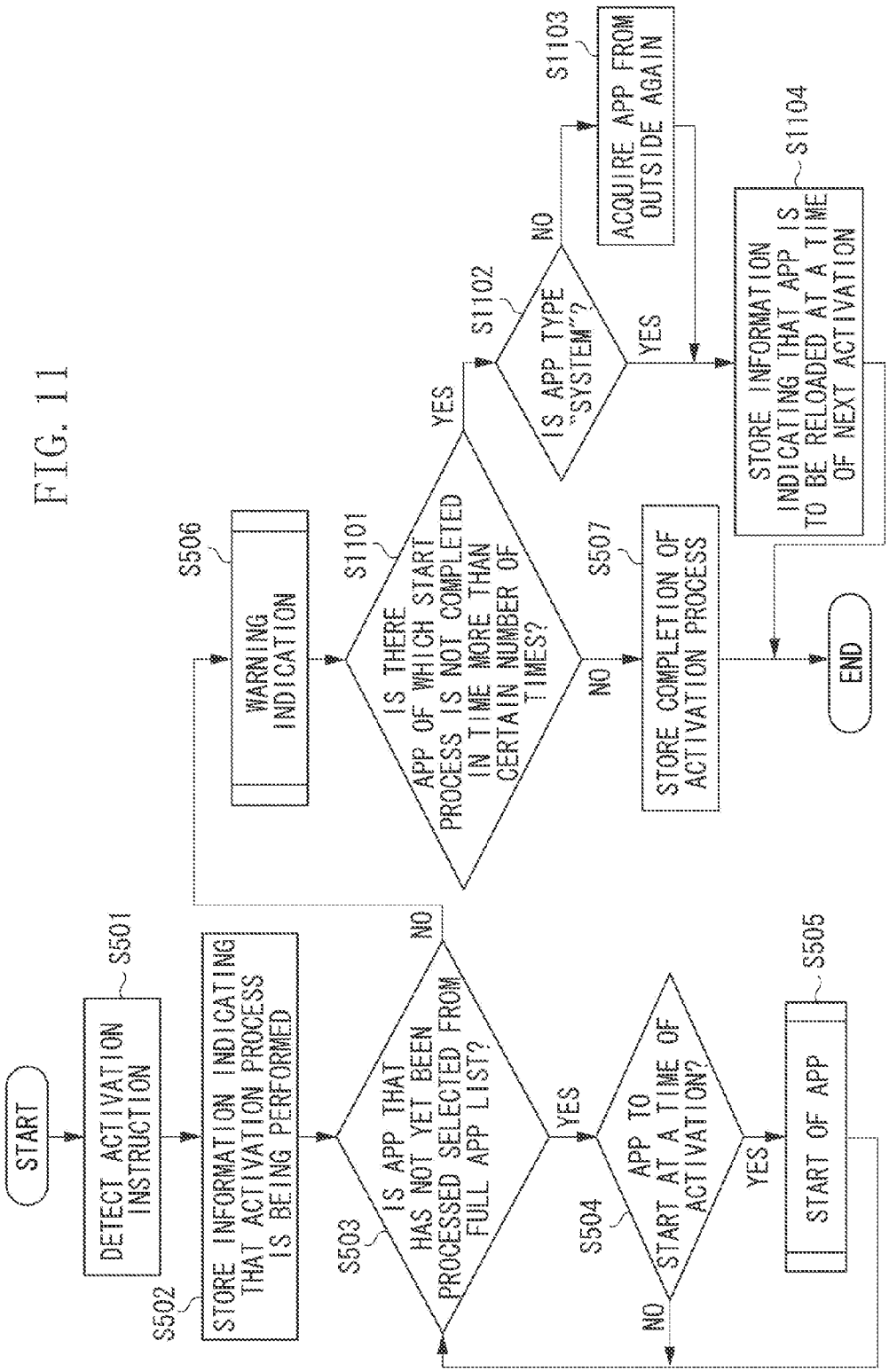
FIG. 11 is a flowchart illustrating an activation process of an image forming apparatus according to a fifth exemplary embodiment.

FIG. 11 is a flowchart illustrating the activation process of the image forming apparatus 100 according to the fifth exemplary embodiment. Steps similar to those in FIG. 5 are designated by the same step numbers and therefore are not described here. In the fifth exemplary embodiment, after the warning indication process in step S506, the activation control unit 203 executes the process of step S1101.

In step S1101, the activation control unit 203 determines whether there is an app of which the start process is not completed in the predetermined time more than a certain number of times. The number of times the start process of each app is not completed in the predetermined time is stored in the auxiliary storage device 104.

Then, if the activation control unit 203 determines that there is no corresponding app (No in step S1101), the processing proceeds to step S507.

If, on the other hand, the activation control unit 203 determines that there is a corresponding app (Yes in step S1101), the processing proceeds to step S1002.

In step S1102, the activation control unit 203 determines the app type of the corresponding app. If the activation control unit 203 determines that the app type of the corresponding app is not "system" (No in step S1102), the processing proceeds to step S1103. An app of an app type other than "system" is not an app prepared in advance as firmware for the image forming apparatus 100. Thus, the app monitoring unit 205 determines that, since app data of the app other than "system" before the app is loaded (e.g., a Java Archive (JAR) file including an original program) is not present in the image forming apparatus 100 (e.g., the non-volatile memory 102), it is necessary to acquire the app from outside.

In step S1103, the app monitoring unit 205 instructs the installation unit 208 to acquire the corresponding app (e.g., the JAR file including the original program) from an external apparatus. According to this instruction, the installation unit 208 acquires the corresponding app from an external apparatus. For example, the installation unit 208 acquires the corresponding app from an external storage device (not illustrated) (e.g., a Universal Serial Bus (USB) memory), or from a server of a vendor via a network apparatus (not illustrated). The acquired app is stored in, for example, a predetermined location of the auxiliary storage device 104 in preparation for installation. After the app monitoring unit 205 instructs the installation unit 208 to acquire the corresponding app in step S1103, the processing proceeds to step S1104.

In step S1104, the activation control unit 203 stores, for example, in the auxiliary storage device 104, information indicating that the corresponding app (e.g., the JAR file including the original program) is to be reloaded in the next activation. Simultaneously, the activation control unit 203 resets the number of times the start process of the corresponding app is not completed in the predetermined time. The app for which the information indicating that the app is to be reloaded in the next activation is stored at this time (e.g., the JAR file including the original program stored in the predetermined location of the auxiliary storage device 104) is reloaded by the installation unit 208 at timing before step S503, when the activation process of the image forming apparatus 100 is executed next time.

If, on the other hand, the app monitoring unit 205 determines in step S1102 that the app type of the corresponding app is "system" (Yes in step S1102), the processing proceeds to step S1104. An app of the app type "system" is an app prepared in advance as firmware for the image forming apparatus 100. Thus, the app monitoring unit 205 determines that app data of the app before the app is loaded (an original program file) is present in the image forming apparatus 100 (e.g., the non-volatile memory 102). Then, the processing immediately proceeds to step S1104.

It has been described above as an example that the app itself of which the start process is not completed in the predetermined time is to be reloaded. It is, however, also likely that in fact, the start process is not completed in the predetermined time due to another app. Thus, the configuration may be such that all apps to start in the activation are to be reloaded.

The image forming apparatus 100 includes a mechanism as illustrated above, whereby it is possible to somewhat automatically improve the state of an app of which the start process is not completed in the predetermined time.

As described above in each exemplary embodiment of the present invention, the configuration is such that, in a state where the activation process of the image forming apparatus is performed, the start process of an application is called from another task (a task for each application) and monitored for a certain time, and if the start process is not completed, the image forming apparatus shifts to the start process of the next app. With this configuration, even in a situation where the start processes of some apps are not completed when the apparatus is activated, it is possible to call the start process of another app, thereby enabling the function of another app to be used. With this configuration, further, even in a case where the start process of an app performed during the activation of the image forming apparatus is not finished for some reason, the image forming apparatus in its entirety can continue the activation process and can call the start process of another app. Thus, even if some apps are in suspended states, it is possible to utilize the function of another app. Further, it is also possible to notify the user of the image forming apparatus of an abnormality.

The configurations and the contents of various types of data are not limited to those described above, and the above various types of data may have various configurations and contents according to the use and purpose.

While exemplary embodiments have been described above, the present invention can employ embodiments as, for example, a system, an apparatus, a method, a program, and a storage medium. Specifically, the present invention may be applied to a system including a plurality of devices or may be applied to an apparatus including a single device.

Further, all the configurations obtained by combining the above exemplary embodiments are also included in the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-075823, filed Apr. 2, 2015, which is hereby incorporated by reference herein in its entirety.

What is claimed is:

1. An information processing apparatus on which a plurality of applications operate, the information processing apparatus comprising:
   a start unit configured to, in a case where one of the applications is to be activated at a time of activating the information processing apparatus, perform a start process of the application based on a task for each of the applications, the task being different from a task giving an instruction to activate the application;
   a monitoring unit configured to monitor whether the start process of the application is completed in a predetermined time; and
   an interruption unit configured to, in a case where the start process of the application is not completed in the predetermined time, interrupt the start process of the application,
   wherein, in a case where the interruption unit interrupts the start process of the application, the start unit shifts to a start process of another one of the applications.

2. The information processing apparatus according to claim 1, wherein, in a case where the application is to be activated at a timing different from that at the time of activating the information processing apparatus, the start unit performs the start process of the application based on the task giving the instruction to activate the application.

3. The information processing apparatus according to claim 1, wherein the predetermined time is a time according to a model of the information processing apparatus, a time according to an operating system of the information processing apparatus, a time according to apparatus specifications of the information processing apparatus, or a time according to the application.

4. The information processing apparatus according to claim 1, further comprising a measurement unit configured to measure, for each application, a time from a start to completion of the start process of the application,
   wherein the predetermined time is the time measured for each application by the measurement unit.

5. The information processing apparatus according to claim 1, further comprising a warning unit configured to issue, to a user of the information processing apparatus, a warning about information concerning the application of which the start process is interrupted by the interruption unit.

6. The information processing apparatus according to claim 1, wherein the information processing apparatus is an image processing apparatus.

7. A method for controlling an information processing apparatus on which a plurality of applications operate, the method comprising:
   performing, in a case where one of the applications is to be activated when the information processing apparatus is activated, a start process of the application based on a task for each of the applications, the task being different from a task giving an instruction to activate the application;
   monitoring whether the start process of the application is completed in a predetermined time; and
   interrupting, in a case where the start process of the application is not completed in the predetermined time, the start process of the application,
   shifting, in a case where the start process of the application is interrupted, to a start process of another one of the applications.

8. A non-transitory storage medium for causing a computer to execute a method for controlling an information processing apparatus on which a plurality of applications operate, the method comprising:
   performing, in a case where one of the applications is to be activated when the information processing apparatus is activated, a start process of the application based on a task for each of the applications, the task being different from a task giving an instruction to activate the application;
   monitoring whether the start process of the application is completed in a predetermined time; and
   interrupting, in a case where the start process of the application is not completed in the predetermined time, the start process of the application,
   shifting, in a case where the start process of the application is interrupted, to a start process of another one of the applications.

* * * * *